No. 787,145. PATENTED APR. 11, 1905.
E. P. BROWN.
SOLAR MOTOR.
APPLICATION FILED DEC. 12, 1903.
3 SHEETS—SHEET 1.
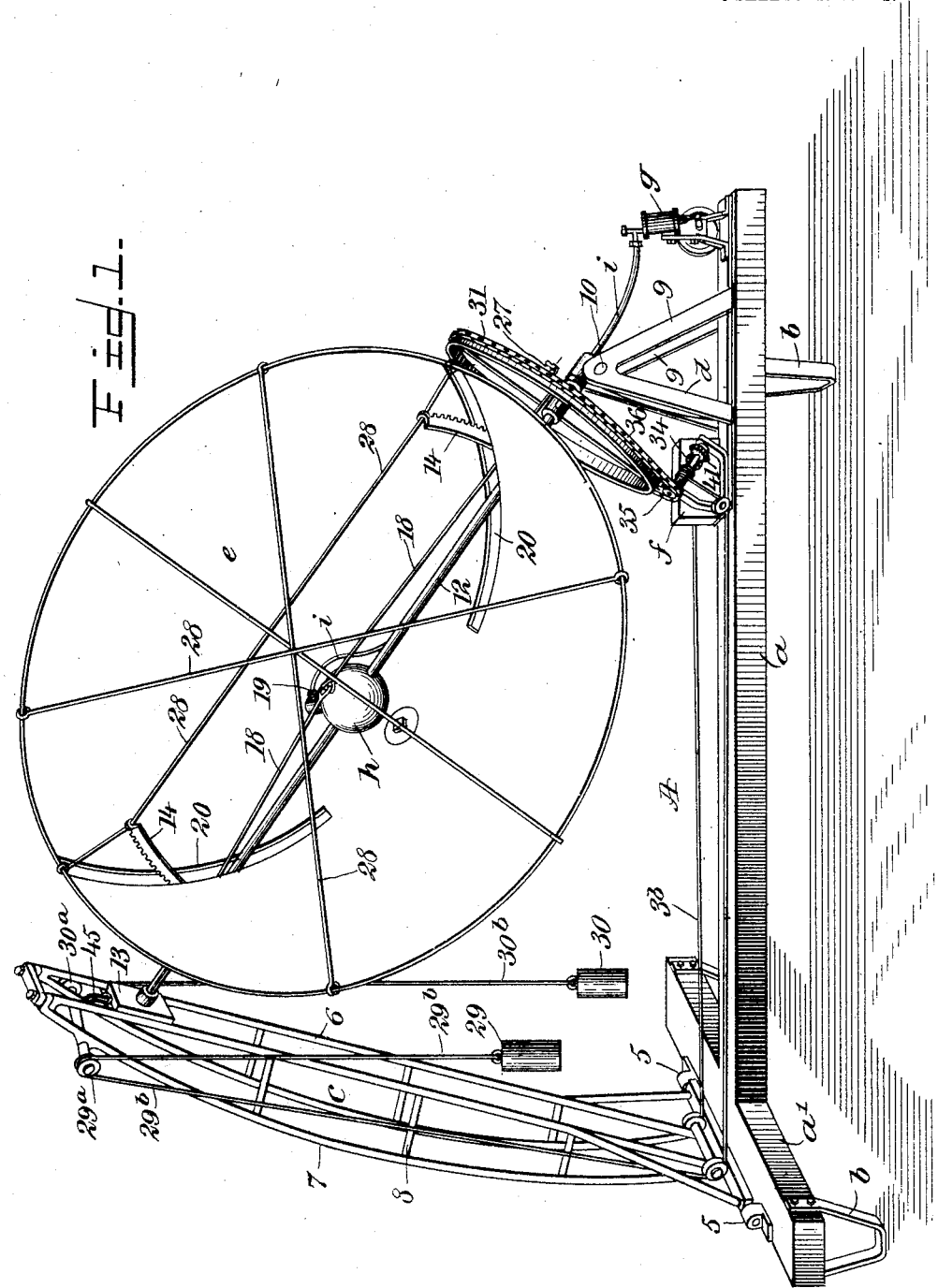
WITNESSES:
AB Mattingly
R B Cavanagh
INVENTOR
Edgar P. Brown
BY Munn & Co
ATTORNEYS

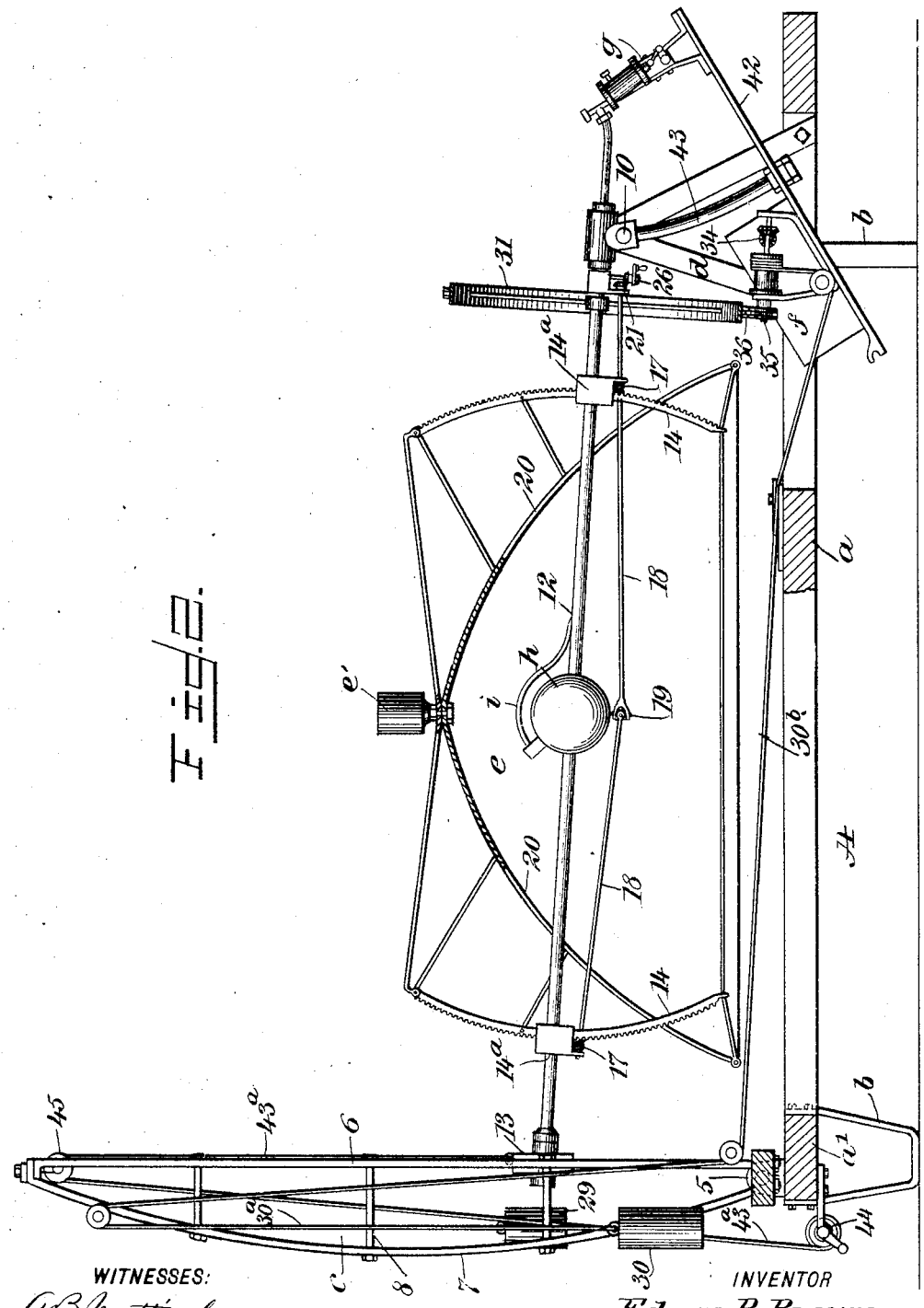

No. 787,145. PATENTED APR. 11, 1905.
E. P. BROWN.
SOLAR MOTOR.
APPLICATION FILED DEC. 12, 1903.
3 SHEETS—SHEET 3.
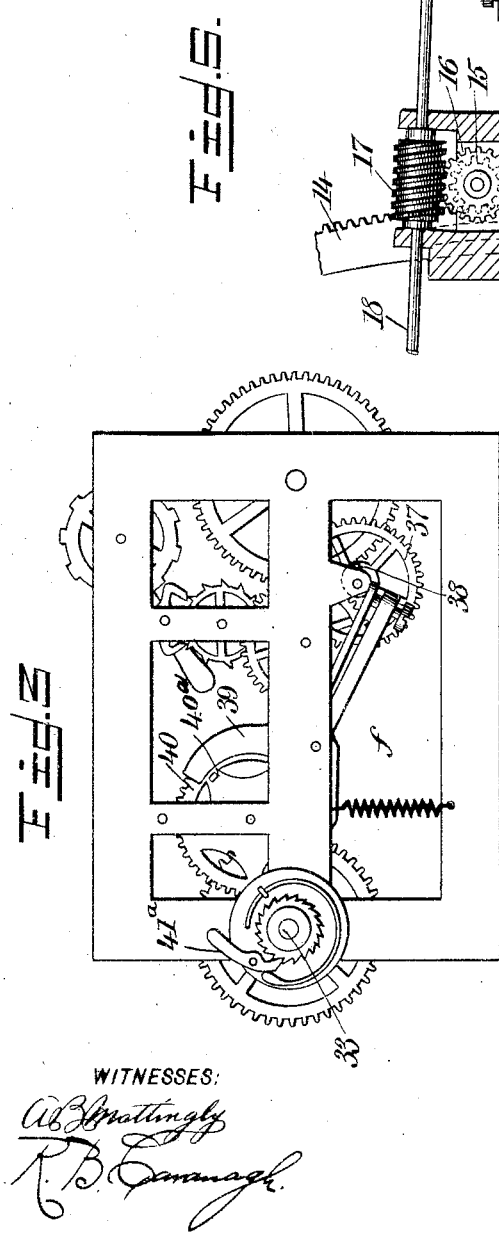
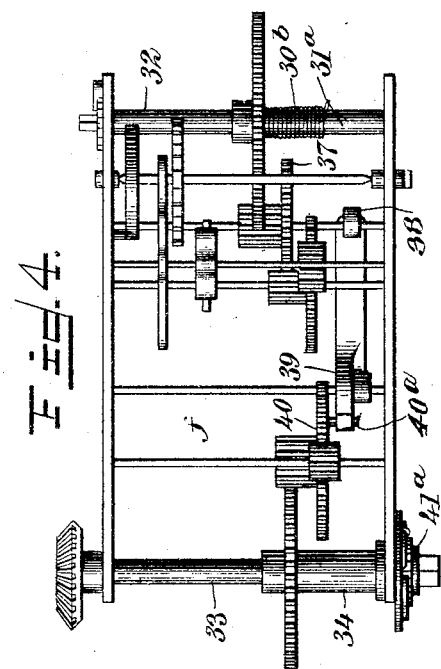
WITNESSES:
INVENTOR
Edgar P. Brown
BY
ATTORNEYS No. 787,145.

Patented April 11, 1905.

UNITED STATES PATENT OFFICE.

EDGAR P. BROWN, OF COTTONWOOD FALLS, KANSAS.

SOLAR MOTOR.

SPECIFICATION forming part of Letters Patent No. 787,145, dated April 11, 1905.

Application filed December 12, 1903. Serial No. 184,909.

*To all whom it may concern:*

Be it known that I, EDGAR P. BROWN, a citizen of the United States, and a resident of Cottonwood Falls, in the county of Chase and State of Kansas, have invented a new and Improved Solar Motor, of which the following is a full, clear, and exact description.

My invention relates to an apparatus for utilizing solar energy and appertains particularly to an apparatus for generating steam by the heat imparted by the rays of the sun.

In carrying out my invention I have particularly in view the provision of an apparatus including a reflector and a boiler, whereby the rays of the sun may be focused by the reflector upon the boiler to generate steam.

Still another object of my invention is to provide an improved reflector designed to turn upon one axis, so as to at all times face or follow the sun in its diurnal movement, said reflector being also capable of moving upon a vertical axis, so as to conform to the annual variations or movements of the sun.

Still another object of my invention is to devise means for raising the reflector to its operative position and reversing and lowering it therefrom, as desired, this being of great importance, as otherwise the reflector, presenting, as it does, a relatively large surface area to the wind, would be liable to injury and destruction by storms and other elemental disturbances.

An additional object is to combine and correlate the elements or parts of my structure so that an engine may be connected direct to the boiler located within the focus of the reflector without the intervention of rotating glands, flexible joints, or flexible pipes.

Another advantage incident to my solar motor is that the boiler remains stationary, while the reflector is mounted independent of and revolves about the same, and the water in the spherical boiler may be gaged to a certainty.

Reference is to be had to the accompanying drawings, forming a part of this specification, in which similar characters of reference indicate corresponding parts in all the figures.

Figure 1 is a perspective view of my improved solar motor, showing the same in its normally operative position. Fig. 2 is a view, partly in elevation and partly in longitudinal section, the reflector being illustrated as reversed and lowered. Fig. 3 is a side view of the clockwork mechanism employed for maintaining the reflector in focus with the movement of the sun from east to west. Fig. 4 is a top view of the same, and Fig. 5 is an enlarged sectional view of the mechanism employed for focusing the reflector north and south.

Before proceeding with a detailed description of my invention I will state that the form which I have illustrated comprises a base-frame, a tower-support, a reflector supported upon a tubular axis, which latter is carried at one end by the tower and at its opposite lower end by a bracket, a boiler mounted on the tubular rod or axis within the focus of the reflector, driving mechanism for the reflector, means for maintaining the focus of the reflector east and west, and means for maintaining such focus north and south, all combined with other elements, such as windlasses, engines, pumps, and the like.

Referring now to the accompanying drawings in detail, A designates the base-frame of my apparatus, such frame in the present instance comprising the longitudinal supporting-beam $a$ and the transverse beam $a'$, each of said beams having supporting-legs $b$. Upon the transverse member of the base are lugs 5 5, by which there is pivotally supported the tower $c$, the latter being in the form of an open framework having one face formed of straight rods 6, while the opposite face is formed of curved rods or bars 7, connected with the straight rods at their ends and also having any number of short reinforcing-braces 8.

At the end of the member $a$ farthest from tower $c$ is mounted a bracket $d$, consisting of a pair of vertically-arranged angle-irons 9, spaced apart, said bracket supporting a pivot-pin 10, on which is mounted one end of the tubular axis or rod 12, the other end of said axis terminating in a block 13, which is mounted to slide along the flat face of the tower. It will be noted that the tower $c$ may swing upon its pivot to accommodate the variable length of the tubular axis 12 in raising and lowering the reflector, as hereinafter described.

Upon the tubular axis 12 is mounted the reflector $e$ of the apparatus, which comprises a body of any suitable reflecting material, preferably dished or hollow—that is to say, having a concave reflecting-face—the reflector being shown in the present instance as a section of an ellipse. The reflector, it will be noted, is balanced upon the tubular axis by a weight $e'$ and is supported by the segmental racks 14, each pair passing through a slotted block $14^a$, mounted upon rotating sleeves on the axis, each of such blocks having in the slotted portion thereof the gear-wheels 15 and 16, the teeth of the racks 14 meshing with the wheel 15, so that when the wheels 15 are rotated the racks will be moved to vary the vertical position of the reflector in compensating for the annual movement of the sun. Motion is imparted to the gear 15, which is on the same shaft as the wheel 16, by means of worms 17, carried at opposite ends of the rods 18 18, which rods have their adjacent ends coupled, as at 19, such connection being somewhat in the nature of a toggle, and the reflector, it will be observed, is provided with the radial slots 20 to provide for the passage and movement of such rods and tubular axis 12.

In order to impart motion to the worms, I connect a bevel-gear 21 to the outer end of one of the rods 18, which end passes through a lug 22, formed on the collar 23, carried by the rotating sleeve $23^a$, a second lug 24, carrying a spindle 25, upon which is mounted a bevel-gear 26, rotated by a handle 27 and adapted to mesh with the bevel-gear 21. One end of each pair of the segmental racks is hooked to one of the ribs 28 of the reflector, so that from the construction thus far described it will be seen that when the handle 27 is actuated motion will be imparted through the worm rods and gears to the segmental racks, so that the inclination of the reflector to the vertical position may be raised or lowered to compensate for the annual variation of the path of the sun.

In order to maintain the reflector in focus with the sun from east to west, I have provided an improved driving mechanism, which comprises a clock $f$, the weights 29 and 30, and a driving-wheel or circle 31, the latter being mounted on the rotating sleeve $23^a$ at the lower end of the tubular axis or shaft 12, while the weights are suspended from cords $29^b$ and $30^b$, extending over pulleys $29^a$ $30^a$, said cords extending back to the clock $f$. This clock, as is shown in Figs. 3 and 4, consists of a time-escapement operated by the weight 30, which is connected to the drum $31^a$ on the shaft 32 of the clock, and of a reflector-escapement actuated by the weight 29, connected to the shaft 33 on the back of the clock through the medium of a bevel-gear on the shaft of the winding-drum 34, said drum being designed to wind the cord $29^b$ of the weight 29. This winding-drum shaft 34 carries a small sprocket-wheel 35, which is connected through the medium of the endless chain 36 with the large driving-wheel or circle 31 upon the axis 12, so that a rotary motion is imparted to the rotating sleeve $23^a$ on the shaft or axis 12 through the medium of the rotation of the wheel 31, which is driven by the endless chain or belt 36. The gear-wheel 37 of the clock is designed to rotate once in every four minutes and carries with it a cam 38, which causes the yoke-escapement 39 to release the gear 40, which latter carries the stud $40^a$. Every two minutes the gear 40, which in turn is connected to the shaft 33, releases the reflector and permits the movement of the same through the medium of the bevel-gear 41, sprocket-wheel 35, and weight 29. It will thus be evident that the rotation of the reflector to follow the diurnal path of travel of the sun is easily and readily accomplished.

The reflector-weight 29 is released by the pawl $41^a$ of the clock and permits the reflector to be reversed when it is desired to lower the same in seeking protection from storm or the like. The means which I have employed for lowering the reflector will be readily understood from reference to the drawings.

The tubular axis 12 is rigidly connected to the supporting-beam 42, which carries the engine $g$ and the clock mechanism $f$. The supporting-beam 42 is designed to be pivotally connected with the pivot-pin 10, through the medium of the supporting-arms 43, so that when the tubular axis 12 is moved or shifted to lower or raise the reflector the beam carrying the engine and the clock may also move, so that such an arrangement will always maintain the engine, the clock, and the driving-wheel 31 in their relative positions whether the reflector is raised or lowered. The opposite end of the tubular shaft or axis 12 is connected with the sliding block 13, and the latter is in turn connected by a cord $43^a$ to the windlass 44, said cord passing over a sheave 45. It will thus be seen that the tubular axis carrying the reflector may be raised or lowered through the operation of the windlass, the block 13 sliding along the flat face 6 of the tower $c$ as the windlass is wound or unwound.

The boiler employed in connection with my device is preferably in the shape of a spherical body, such as shown at $h$, and is mounted approximately centrally of the tubular axis, said boiler having a sleeve passing therethrough to accommodate the tubular shaft or axis 12. The boiler is mounted in such position that it will remain in focus of all the rays reflected by the reflector, and said boiler is connected to the small engine $g$ through the medium of suitable steam and water pipes, shown conventionally at $i$, these pipes passing through the tubular axis to the boiler.

From the description, taken in connection with the accompanying drawings, the construction and operation of my improved solar motor will be readily apparent, so that it is unnecessary to enter into any lengthy detail description of such operation. It will be noted, however, that the tower being raised to any suitable position the tubular shaft or axis 12, carrying the reflector, may be raised to a desired position and lowered with the assistance of the windlass 44, and the movement of the reflector to follow the diurnal course of the sun, thereby always maintaining a focus upon the spherical boiler, is permitted. The vertical movement or inclination of the reflector is also attained through the mechanism just described, so that the parts or elements constituting the entire structure are so correlated and arranged as to obtain the best possible results of solar-heat energy.

While I have herein shown one particular embodiment of my invention, I wish it to be understood that I do not confine myself to all the precise details herein recited, as there may be modifications and variations in certain respects without departing from the essential features of the invention or sacrificing any of the advantages thereof.

Having thus described my invention, I claim as new and desire to secure by Letters Patent—

1. The combination of a frame, a reflector therefor, means for raising and lowering said reflector, mechanism for permitting the shifting of the reflector, through a lateral plane, means for inverting the reflector and means for permitting the adjustment of the reflector vertically.

2. The combination of a frame, a tower pivotally supported on said frame, a hollow shaft having one end movably supported by the tower, a reflector and a boiler mounted upon said shaft, an engine, pipes passing lengthwise through said shaft from said boiler to said engine and means for moving the shaft to permit the raising and lowering of the reflector.

3. The combination of a frame, a tower pivotally supported on said frame, a shaft having one end movably supported by the tower, a reflector and a boiler mounted upon said shaft, means for moving the shaft to permit the raising and lowering of the reflector, means for reversing said reflector, and means for changing the position of the same.

4. The combination of a main frame, a tower supported on said frame, a bracket, a tubular shaft loosely supported by the tower and bracket, a reflector movably mounted on said shaft, a boiler rigidly carried by the shaft, means for changing the position of the reflector to conform to the annual path of travel of the sun, means for moving the reflector to follow the diurnal path of the sun, said latter means including a clockwork and escapement mechanism, and means for inverting said reflector.

5. The combination of a main frame, a tower movably connected to the main frame, a bracket, a tubular shaft having one end slidably mounted in the tower and the opposite end pivoted to the bracket, a boiler carried by said shaft, a steam-pipe leading from the boiler lengthwise through the shaft, a reflector movably mounted on said shaft, means for moving said reflector to follow the annual travel of the sun, and mechanism for moving the reflector to follow the daily path of travel of the sun, said latter means including a wheel carried by the shaft, a clock mechanism and escapement mechanism, means for operating the wheel from the escapement mechanism, and means for operating the clock mechanism.

6. The combination of a main frame, a shaft supported on the main frame and designed to move relatively to the latter, a spherical boiler rigidly supported on the shaft, a reflector movably mounted upon the shaft, and means for moving the reflector to follow the annual path of the sun, said means including segmental racks connected to the reflector, gearing connected with said segmental racks, and means for operating said gearing to cause the movements of the racks and the reflector.

7. The combination of a main frame, a tubular shaft, a steam-pipe passing lengthwise through said tubular shaft, a boiler mounted upon said shaft, a reflector mounted upon said shaft, and means for moving said reflector to follow the daily path of the sun, said means including a clock mechanism, an escapement mechanism operated from the clock mechanism, and means for imparting motion from the escapement mechanism to the shaft to turn the latter.

8. The combination of a solar reflector, a boiler, a tubular shaft extending through the boiler and upon which the reflector is mounted, means for moving said shaft vertically to raise and lower the reflector, rotating sleeves on the shaft and secured to the reflector, and means for rotating the sleeves on the shaft to follow the daily path of travel of the sun, said latter means including a wheel carried by the rotating sleeve, a clock mechanism, an escapement mechanism operated from the clock mechanism, and connections including an endless chain between the wheel and the escapement mechanism for causing a complete rotation of the reflector.

9. The combination of a main frame, a reflector, means for raising or lowering the reflector, means for reversing the reflector, and mechanism for turning the reflector to follow the yearly path of travel of the sun, said latter mechanism including segmental racks connected to the reflector, boxes through which said racks pass, gearing within said boxes intermeshing with the racks, and means including rods carrying worm-gears intermeshing with the gears in the boxes for actuating the segmental racks.

10. The combination of a main frame, a tower, a bracket upon the main frame, a tubular shaft movably supported by the bracket and tower, a reflector carried by said shaft, a spherical boiler arranged within the focus of the reflector, a steam-pipe leading from the boiler through the shaft, means for raising and lowering the reflector, mechanism for turning the reflector to follow the daily movements of the sun, means for moving the reflector to follow the annual path of travel of the sun, and an engine connected with the boiler.

11. The combination of a frame, a reflector therefor, means for raising and lowering the reflector, mechanism for shifting the reflector laterally, means for the adjustment of the reflector vertically, means for inverting the reflector and an engine and boiler.

12. The combination of a frame, a tower, a bracket, a hollow shaft, bearing-sleeves, boxes, segmental racks, a reflector rigidly attached to and carried by said segmental racks, said segmental racks being actuated by worms and gears contained in said boxes, said worms carried by rods, said rods being connected together by a universal joint.

In testimony whereof I have signed my name to this specification in the presence of two subscribing witnesses.

EDGAR P. BROWN.

Witnesses:
 JENNIE BAKER,
 G. E. BRANDLEY.